United States Patent [19]

Quon et al.

[11] Patent Number: 5,789,622

[45] Date of Patent: Aug. 4, 1998

[54] FOCAL PLANE ARRAY CALIBRATION METHOD

[75] Inventors: Bill H. Quon, Aliso Viejo; Paul S. Lee, La Palma; Steven W. Fornaca, Torrance; Karen E. Yokoyama, Rancho Palos Verdes, all of Calif.

[73] Assignee: TRW Inc., Redondo Beach, Calif.

[21] Appl. No.: 712,757

[22] Filed: Sep. 12, 1996

[51] Int. Cl.$^6$ ..................................... G01J 5/10
[52] U.S. Cl. .................. 364/571.02; 364/571.05; 250/342; 250/332; 250/341.5; 356/141.1
[58] Field of Search ............... 364/571.01, 571.02, 364/516, 571.05; 356/72, 141.1, 448; 359/152, 113, 172; 358/494; 250/341.5, 342, 332, 203.2, 203.6, 203 R; 348/294

[56] References Cited

U.S. PATENT DOCUMENTS

| | | | |
|---|---|---|---|
| 4,323,987 | 4/1982 | Holtz | 365/229 |
| 4,767,937 | 8/1988 | Norsworthy | 250/578 |
| 4,893,925 | 1/1990 | Sweeney | 356/72 |
| 5,001,650 | 3/1991 | Francis | 364/516 |
| 5,129,595 | 7/1992 | Thiede | 244/3.16 |
| 5,140,147 | 8/1992 | Barnett | 250/332 |
| 5,300,780 | 4/1994 | Denney | 250/342 |
| 5,345,304 | 9/1994 | Allen | 356/5 |
| 5,390,040 | 2/1995 | Mayeux | 359/152 |
| 5,420,419 | 5/1995 | Wood | 250/338 |
| 5,424,543 | 6/1995 | Dombrowski | 250/330 |
| 5,650,622 | 7/1997 | Ookawa et al. | 250/332 |

Primary Examiner—James P. Trammell
Assistant Examiner—Kamini Shah
Attorney, Agent, or Firm—Michael S. Yatsko

[57] ABSTRACT

A method of calibrating gains and offsets for a two-dimensional detector array 10 comprising individual detector elements 14, including: (a) focusing a first incoming image signal at a first power level onto the detector array 10; (b) reading the corresponding electrical signals from the detector elements 14 as a first image frame at the first power level; (c) for each detector element 14, translating the first incoming image signal by a detector element distance onto an adjacent detector element; (d) reading the corresponding electrical signal from the detector elements 14 as a second image frame at the first power level; (e) focusing a second incoming image signal at a second power level onto the detector array 10; (f) reading the corresponding electrical signals from the detector elements 14 as a first image frame at the second power level; (g) for each detector element 14, translating the second incoming image signal by a detector element distance onto an adjacent detector element; (h) reading the corresponding electrical signals from the detector elements 14 as a second image frame at the second power level; (i) selecting a reference detector element 18; (j) determining the gain of detector elements adjacent to the reference detector element 18; and (k) determining the offset of the adjacent detector elements 14.

23 Claims, 5 Drawing Sheets

FOCAL PLANE ARRAY CALIBRATION METHOD

BACKGROUND

The invention relates to the field of focal plane array sensors (FPA) and in particular to focal place array flat-field calibration by a cross-pixel step-stare reflector.

Focal plane arrays are optical sensing devices utilized in imaging and night vision devices such as the forward looking infrared (FLIR) systems, surveillance systems, and sensory/tracking systems for weapon control. In FLIR systems, for example infrared radiation emanating from objects is detected with an array of photodetectors, converted to electrical signals and then electronically displayed, recorded or used for automatic detection and/or track of targets. FPAs are particularly useful in detecting weak objects or objects whose emitted radiation has been strongly attenuated by atmospheric conditions.

Stare FPA scanning devices, i.e., devices having multiple detector elements assembled into an array, include a two-dimensional array of elements which simultaneously receive information from an area within the field of view of the FPA utilizing electronic scanning. An optical scanning assembly scans the field of view at a number of different viewing angles and reflects the signals received from a particular viewing angle to the scanning array. The optical scanning assembly can include oscillating mirrors or vertically and horizontally rotating prisms to hold or "stare" while scanning at a particular viewing angle and then move or "step" to a new viewing angle, scanning at this new viewing angle and so on.

Calibration of the FPA gains and offsets is often required for achieving the designed resolution of an imaging optics system. This procedure generally requires a uniform noise source or one with a profile function precisely known. When such a high quality source is not available, specifically during field tests, accurate calibration is not obtainable, and the system's imaging capability would be degraded.

Flat-field calibration sources are usually difficult to include in the imaging optics system because limitations in space and cost. This is particularly the case for long wave applications. In particular, passive millimeter wave imaging technology, providing visibility in obscured weather such as in fog, rain and snow, require substantially simplified and improved calibration, for both pixel gains and offsets.

There is therefore a need for a calibration technique without the use of the uniform or flat-field source. There is also a need for system utilizing a simplified calibration technique, such that the system saves cost and space.

SUMMARY

The present invention satisfies these needs. The present invention provides a method of calibrating gains and offsets for a two-dimensional detector array comprising individual detector elements. The method comprises the steps of: focusing a first incoming image signal at a first power level onto the detector array; reading the corresponding electrical signals from the detector elements as a first image frame at the first power level; for each detector element, translating the first incoming image signal by a detector element distance onto an adjacent detector element; reading the corresponding electrical signal from the detector elements as a second image frame at the first power level; focusing a second incoming image signal at a second power level onto the detector array; reading the corresponding electrical signals from the detector elements as a first image frame at the second power level; for each detector element, translating the second incoming image signal by a detector element distance onto an adjacent detector element; and reading the corresponding electrical signals from the detector elements as a second image frame at the second power level.

The method further comprises the steps of: selecting a reference detector element; determining the gain of detector elements adjacent to the reference detector element from: (1) the corresponding electrical signals of the reference detector element and said adjacent detector elements from the first and the second images at the first and the second power levels, respectively, and (2) the gain of the reference detector element; and determining the offset of said adjacent detector elements from: (1) the corresponding electrical signals of the reference detector element and said adjacent detector elements from the first and second image frames at the first power level, (2) the gain of the reference detector element, (3) the offset of the reference detector element, and (4) the gain of said adjacent detector elements. The selection and determination steps can be repeated for all detector elements of the detector array.

The present invention also provides a computer software system including program instructions implementing the method of the present invention.

The present invention also provides a focal plane array calibration system for calibrating the gains and offsets for a two-dimensional detector array comprising individual detector elements. The system comprises: an optical assembly for focusing incoming image signals onto the detector array; an input system for reading the corresponding electrical signals from the detector elements; and a controller for controlling the optical assembly and the input system for: focusing a first incoming image signal at a first power level onto the detector array; reading the corresponding electrical signals from the detector elements as a first image frame at the first power level; translating the first incoming image signal by a detector element distance onto an adjacent detector element for each detector element; reading the corresponding electrical signals from the detector elements as a second image frame at the first power level; focusing a second incoming image signal at a second power level onto the detector array; reading the corresponding electrical signals from the detector elements as a first image frame at the second power level; translating the second incoming image signal by a detector element distance onto an adjacent detector element for each detector element; and reading the corresponding electrical signals from the detector elements as a second image frame at the second power level.

The system further comprises a processor for: selecting a reference detector element; determining the gain of detector elements adjacent to the reference detector element from: (1) the corresponding electrical signals of the reference detector element and said adjacent detector elements from the first and the second images at the first and the second power levels, respectively, and (2) the gain of the reference detector element; and determining the offset of said adjacent detector elements from: (1) the corresponding electrical signals of the reference detector element and said adjacent detector elements from the first and second image frames at the second power level, (2) the gain of the reference detector element, (3) the offset of the reference detector element, and (4) the gain of said adjacent detector elements.

DRAWINGS

These and other features, aspects and advantages of the present invention will become understood with reference to the following description, appended claims and accompanying drawings where:

DESCRIPTION

Figure 1:
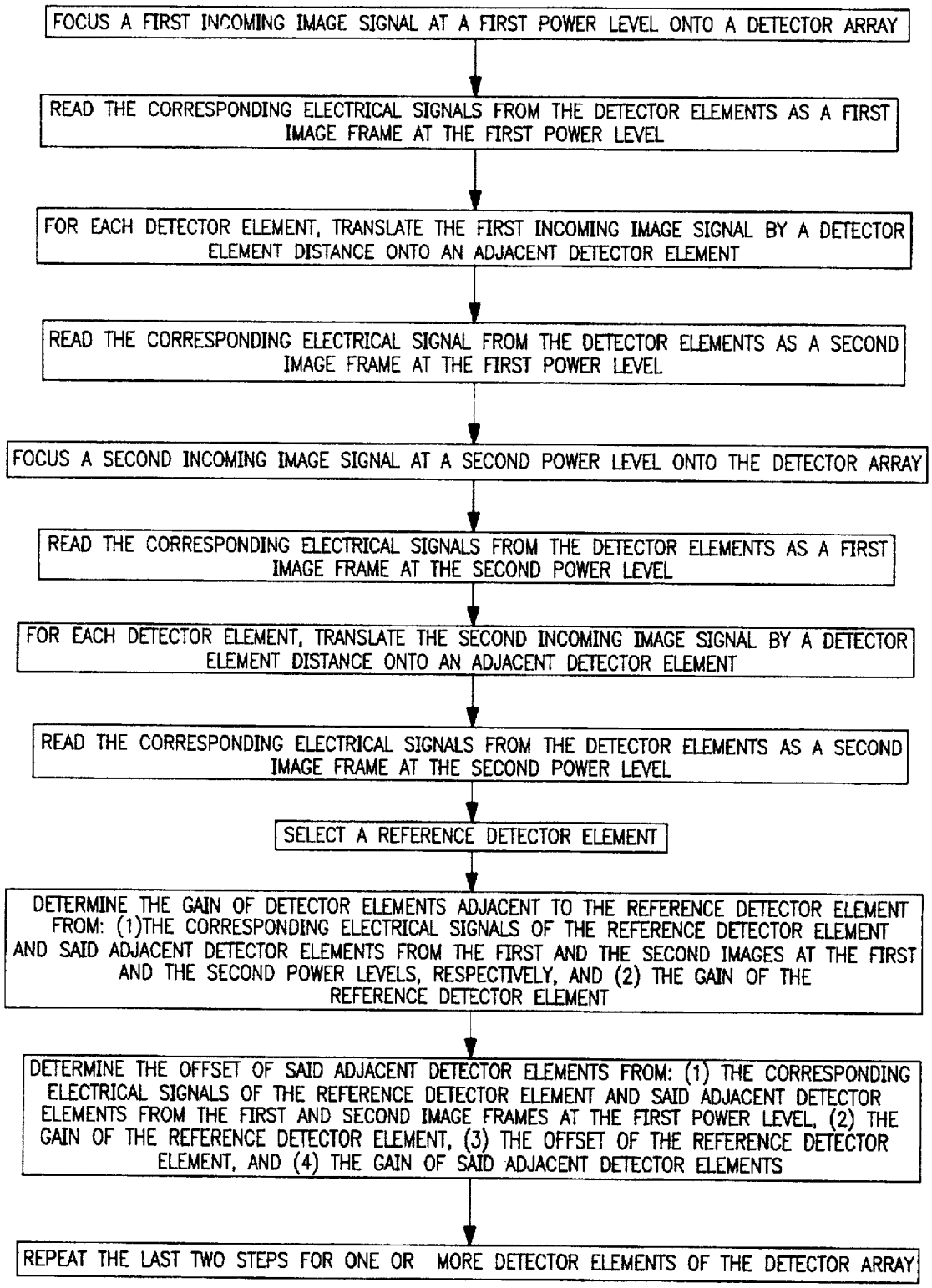
FIG. 1 illustrates the steps of a method of calibrating gains and offsets of a detector array according to the present invention.

Referring to the drawings, a method of calibrating gains and offsets for a two-dimensional detector array 10 according to the present invention includes the high level steps of focusing the image of a calibration source 12 at a source power level onto the detector elements 14 of the two-dimensional detector array 10. Resulting electrical signals from the detector elements 14 are stored in a memory device. The image of calibration source 12 is then translated by one or more pixel distance, by a step-stare reflector assembly 16, so that the same illumination effect is produced on the adjacent detector of every detector element 14. The electrical signals from the detector elements 14 are compared with the stored values to obtain offset and gain calibration.

Referring to FIG. 1, in a preferred embodiment, the method of the present invention comprises the steps of: focusing a first incoming image signal at a first power level onto the detector array 10; reading the corresponding electrical signals from the detector elements 14 as a first image frame at the first power level; for each detector element 14, translating the first incoming image signal by a detector element distance onto an adjacent detector element 14; reading the corresponding electrical signal from the detector elements 14 as a second image frame at the first power level; focusing a second incoming image signal at a second power level onto the detector array 10; reading the corresponding electrical signals from the detector elements 14 as a first image frame at the second power level; for each detector element 14, translating the second incoming image signal by a detector element distance onto an adjacent detector element 14; and reading the corresponding electrical signals from the detector elements 14 as a second image frame at the second power level.

The method further comprises the steps of: selecting a reference detector element 14; determining the gain of detector elements adjacent to the reference detector element 14 from: (1) the corresponding electrical signals of the reference detector element 14 and said adjacent detector 14 elements from the first and the second image frames at the first and the second power levels, respectively, and (2) the gain of the reference detector element 14; and determining the offset of said adjacent detector elements from: (1) the corresponding electrical signals of the reference detector element 14 and said adjacent detector elements from the first and second image frames at the first power level, (2) the gain of the reference detector element 14, (3) the offset of the reference detector element 14, and (4) the gain of said adjacent detector elements. The selection and determination steps can be repeated for all detector elements of the detector array.

Figure 2:
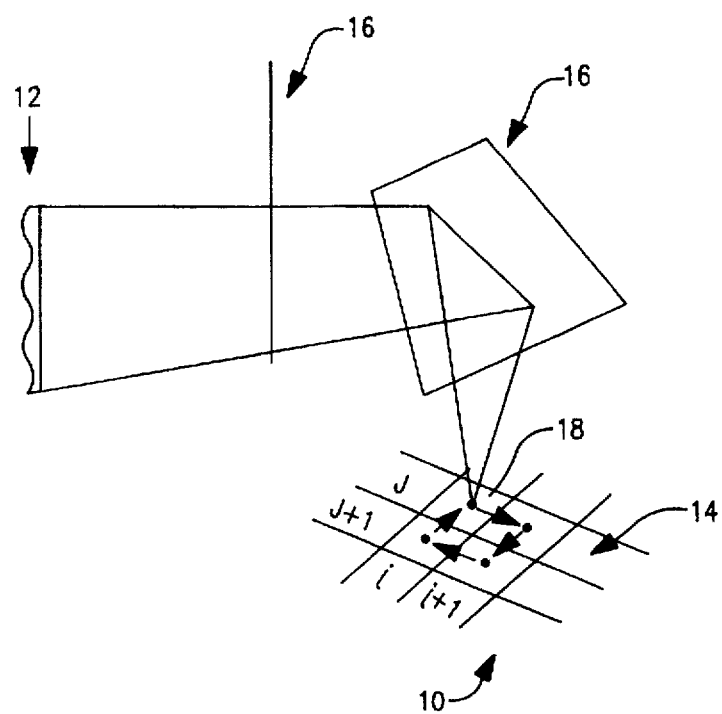
FIG. 2 illustrates an embodiment of a calibration cycle according to the method of FIG. 1.

As shown in FIG. 2, an FPA calibration method according to the present invention utilizes a step-stare reflector 16 with an unspecified noise source 12. An FPA 10 is an orthogonal, two-dimensional detector array with N×M detectors 14. The detectors 14 can be visible light, infrared, millimeter wave or microwave sensors.

For offset calibration, the natural background source is sufficient. A switch noise source with illumination power slightly higher than the background radiation is used for pixel gain calibration. In both cases, advantageously, source uniformity and knowledge of the source function amplitude are not required.

An implementation of the above method includes six general steps. The first step includes focusing the image signal of the switching calibration source 12 at the first power level onto the FPA 10, then digitizing and recording the corresponding electrical signal levels for the entire FPA 10 as a first image frame at the first source power level. The second step includes translating horizontally (vertically) the image signal of the switching calibration source 12 at the first power level by one pixel distance to the left (top), so the adjacent detector element to the left (top) of every element 14 on the FPA 10, except the one on the left (top) edge of the FPA 10, observes the same image as that observed by a reference element 18 in the first step, then digitizing and recording the corresponding electrical signals for the entire FPA as a second image frame at the first source power level.

The third step includes focusing the image signal of the switching calibration source 12 at the second power level on to the FPA 10, then digitizing and recording the corresponding electrical signal levels for the entire FPA 10 as a first image frame at the second source power level. The fourth step includes translating horizontally (vertically) the image signal of the switching calibration source 12 at the second power level one pixel distance to the right (down), so the adjacent detector element to the top (bottom) of every element on the FPA 10, except the one on the right (bottom) edge of the FPA, observes the same image as that observed by the reference element 18 in the third step, then digitizing and recording the corresponding electrical signal levels as the second image frame at the second source power level.

The fifth step includes determining the gain of every adjacent detector element 14 from: (1) the ratio of the difference of the electrical signals observed by the reference detector element 18 under the two source power levels used to the difference of that observed by the adjacent detectors 14 under the same source power levels, and (2) the gain of the reference detector 18.

The sixth step includes determining the offset of every adjacent detector element 14 from; (1) the corresponding electrical signals observed by the adjacent detector element 14 and the reference detector 18 under the same source power level, (2) the gain of the reference detector 18, (3) the offset of the reference detector 18, and (4) the gain of the adjacent detector element 14. The above steps are repeated for all detector elements 14 of the FPA 10 except one. The one detector which has no other detector to refer to will be calibrated in a separated procedure.

Calibration Principle

Figure 3:
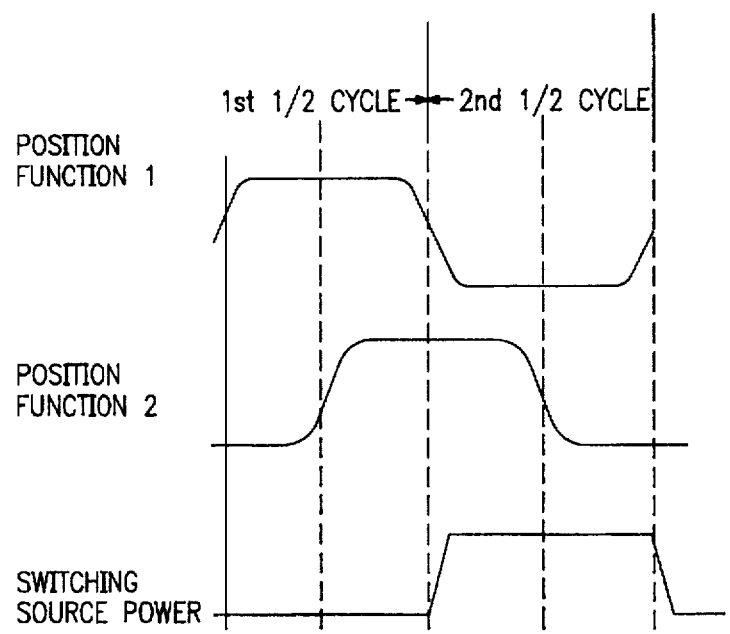
FIG. 3 illustrates the synchronized source amplitude with the step-stare reflector waveform of FIG. 2.

The calibration principle utilized in the present invention is described in this section. Referring to FIG. 2, the detectors 14 are arranged in the form of a two-dimensional array with N×M pixel elements, or a N×M FPA. In calibration mode, the image observed by a reference pixel (i,j) is moved to walk through the neighboring three pixels, (i+1,j), (i+1,j+1) and (i,j+1), in a 4-step cycle and the switching source 12 is synchronized with the step-stare motion, as shown in FIG. 3.

For the first ½ cycle, the following relations are computed:

$$V_{ij} = A_{ij} S_{ij} + O_{ij} \quad (1)$$

$$V_{i+1,j} = A_{i+1,j} S_{ij} + O_{i+1,j} \quad (2)$$

where $A_{ij}$, $O_{ij}$, and $S_{ij}$ are the pixel gains, pixel offset, and source strength respectively, and i=1,2,... N, and j=1,2 ... M.

From relations (1) and (2) the offset of pixel i+1,j can be obtained from the following relation:

$$O_{i+1,j} = (V_{ij}/A_{ij} - V_{i+1,j}/A_{i+1,j}) + O_{ij} A_{ij}/A_{i+1,j} \quad (3)$$

for i=1,2 ... N-1, and j=1,2, ... M.

The only restriction for relation (3) is that $S_{ij} \neq 0$. Thus the offset value of all pixels can be expressed in terms of the offset value of one detector if the pixel gains values are known.

In the second ½ cycle, the above measurements are repeated with a different source function. Denoting the signals detected by $V'_{ij}$ and $V'_{i+j}$, the following relation is obtained:

$$O_{i+1,j} = (V'_{ij}/A_{ij} - V'_{i+1,j}/A_{i+1,j}) + O_{ij} A_{ij}/A_{i+1,j} \quad (4)$$

for i=1, ... N-1, and j=1,2, ... M.

Subtracting relation (4) from relation (3) yields:

$$A_{i+1,j} = (V'_{ij} - V_{ij})/(V'_{i+1,j} - V_{i+1,j}) \times A_{ij} \quad (5)$$

for i=1,2, ... N-1, j=1,2, ... M.

To insure that $V'_{ij} - V_{ij} \neq 0$, the switching source 12 has higher power than the background radiation level, but detailed knowledge of the source amplitude is not required. As in relation (3), relation (5) expresses all pixel gains in terms of the gain of the first pixel.

Implementation of the Calibration Principle

The step-stare reflector 16 is utilized to achieve offset and gain calibration of the FPA 10. The step-stare reflector 16 is used to move the image over the FPA 10 by exactly one pixel (per step) in each field of view (FOV) dimensions to an accuracy specified by the calibration requirement. As such, the reflector 16 provides a physically identical illumination for every adjacent pixel pair, thereby allowing a quantitative comparison for the offset and gain of these two pixels.

Since every pixel (i,j) on the FPA 10 is compared to its adjacent pixel which is exposed to the same illumination under the effect of the step-stare reflector's motion, the offset and gain comparison between the adjacent pixel pair can be cascaded from one end to the other in the direction of the step-stare motion. With the knowledge of the absolute gain for one pixel, the gain and offset calibration for the entire FPA 10 can be obtained without using a flat (uniform) calibration source.

A two-dimensional step-stare reflector is used to obtain two-dimensional FPA 10 calibration. The presence of a few isolated bad pixels does not impair the cascaded calibration method because calibration beyond those bad pixels in one dimension (i.e. the x dimension) can be cascaded from the other dimension (i.e. the y dimension).

In a preferred embodiment of the invention, cascaded calibration includes utilizing the step-stare reflector 16 to move an incoming image signal in a four-step cyclic motion in the following manner:

(a) The images observed by each detector, denoted by $P_{ij}$, (I=1,2,3 ... N; j=1,2,3, ... M), are observed identically by the three neighboring detectors $P_{i+1,j}$, $P_{i-1,j+1}$, and $P_{i,j+1}$ (i=1,2,3, ... N; j=1,2,3 ... M), as shown in FIG. 2.

(b) The signal detected at $P_{ij}$ is defined by:

$$V_{ij} = A_{ij} S_{ij} + O_{ij} \quad (1)$$

where $O_{ij}$ is the detector offset signal, $A_{ij}$ is the detector signal gain and $S_{ij}$ is the source strength.

(c) The signal detected at $P_{i+1,j}$ is defined by:

$$V_{i+1,j} = A_{i+1,j} S_{ij} + O_{i+1,j} \quad (2)$$

where $O_{i+1,j}$ is the detector offset signal, $A_{i+1,j}$ is the detector signal gain and $S_{ij}$ is the source strength. The source strength in relation (1) is the same as that in relation (2).

(d) From relation (1) and relation (2), the cascaded equation for the offsets are obtained:

$$O_{i+1,j} = (V_{ij}/A_{ij} - V_{i+1,j}/A_{i+1,j}) + O_{ij} A_{ij}/A_{i+1,j} \quad (3)$$

(e) The steps for obtaining relations (1) and (2) are repeated with a different source $S'_{ij}$, using the synchronized switching source. The signals detected at $P_{ij}$ and $P_{i+1,j}$ are $V'_{ij}$ and $V'_{i+1,j}$, respectively, equivalent to relation (3). The offset of $P_{i+1,j}$ is defined as:

$$O_{i+1,j} = (V'_{ij}/A_{ij} - V'_{i+1,j}/A_{i+1,j}) + O_{ij} A_{ij}/A_{i+1,j} \quad (4)$$

(f) Combining relations (3) and (4) the cascaded equation for the pixel gain for index i in the x dimension is:

$$A_{i+1,j} = A_{ij}(V'_{ij} - V_{ij})/(V'_{i+1,j} - V_{i+1,j}) \quad (5)$$

(g) Similar cascaded equations are obtained for index j in the y dimension based on the step-stare effect on position $P_{i+1,j}$ and $P_{i+1,j+1}$.

The method of the present invention can be implemented as a computer software system for a dedicated processor, such as an TMS 320C50, or a general purpose computer such as a personal computer. The steps of the method of the present invention can be programmed as program instructions utilizing a program language such as C as is well known to the practitioners in the art. The mathematical relations can be implemented utilizing a simulation package of a math library readily available.

Figure 4:
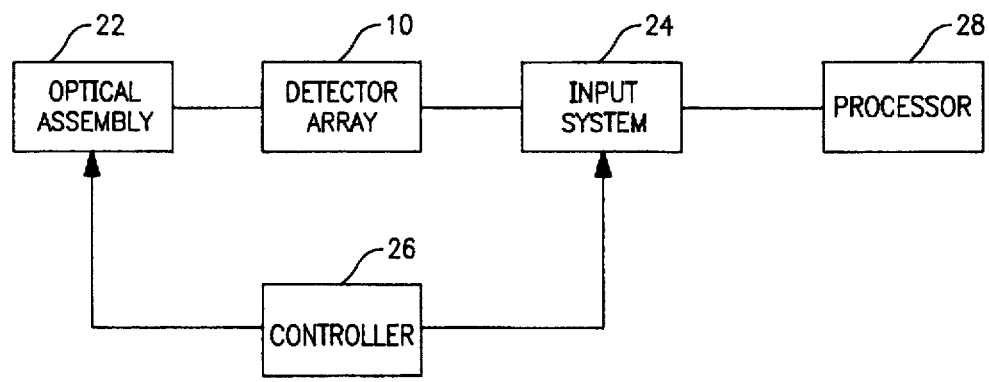
FIG. 4 illustrates a block diagram of a calibration system according to the present invention.

In another aspect, the present invention provides a focal plane array calibration system 20 for calibrating the gains and offsets for a two-dimensional detector array 10 comprising individual detector elements shown in FIG. 4. The system 20 comprises: an optical assembly 22 for focusing incoming image signals onto the detector array 10; an input system 24 for reading the corresponding electrical signals from the detector elements 14; and a controller 26 for controlling the optical assembly 22 and the input system 24 for: focusing a first incoming image signal at a first power level onto the detector array 10; reading the corresponding electrical signals from the detector elements 14 as a first image frame at the first power level; translating the first incoming image signal by a detector element distance onto an adjacent detector element 14 for each detector element;

reading the corresponding electrical signals from the detector elements 14 as a second image frame at the first power level; focusing a second incoming image signal at a second power level onto the detector array 10; reading the corresponding electrical signals from the detector elements 14 as a first image frame at the second power level; translating the second incoming image signal by a detector element distance onto an adjacent detector element for each detector element 14; and reading the corresponding electrical signals from the detector elements 14 as a second image frame at the second power level.

The system 20 further comprises a processor 28 for: selecting a reference detector element 18; determining the gain of detector elements 14 adjacent to the reference detector element 18 from: (1) the corresponding electrical signals of the reference detector element 18 and said adjacent detector elements 14 from the first and the second images at the first and the second power levels, respectively, and (2) the gain of the reference detector element 18; and determining the offset of said adjacent detector elements 14 from: (1) the corresponding electrical signals of the reference detector element 18 and said adjacent detector elements 14 from the first and second image frames at the second power level, (2) the gain of the reference detector element 18, (3) the offset of the reference detector element 18, and (4) the gain of said adjacent detector elements 14.

The optical assembly 22, the detector array 10, the input system 24 and the controller 26 are well-known to the art and, therefore, described as an example below. The method of the present invention described herein and shown in the drawings can be used as a pseudo code for programming a general purpose or dedicated computer system. Example computer systems suitable for use with the present invention are described in the example below.

Figure 5:
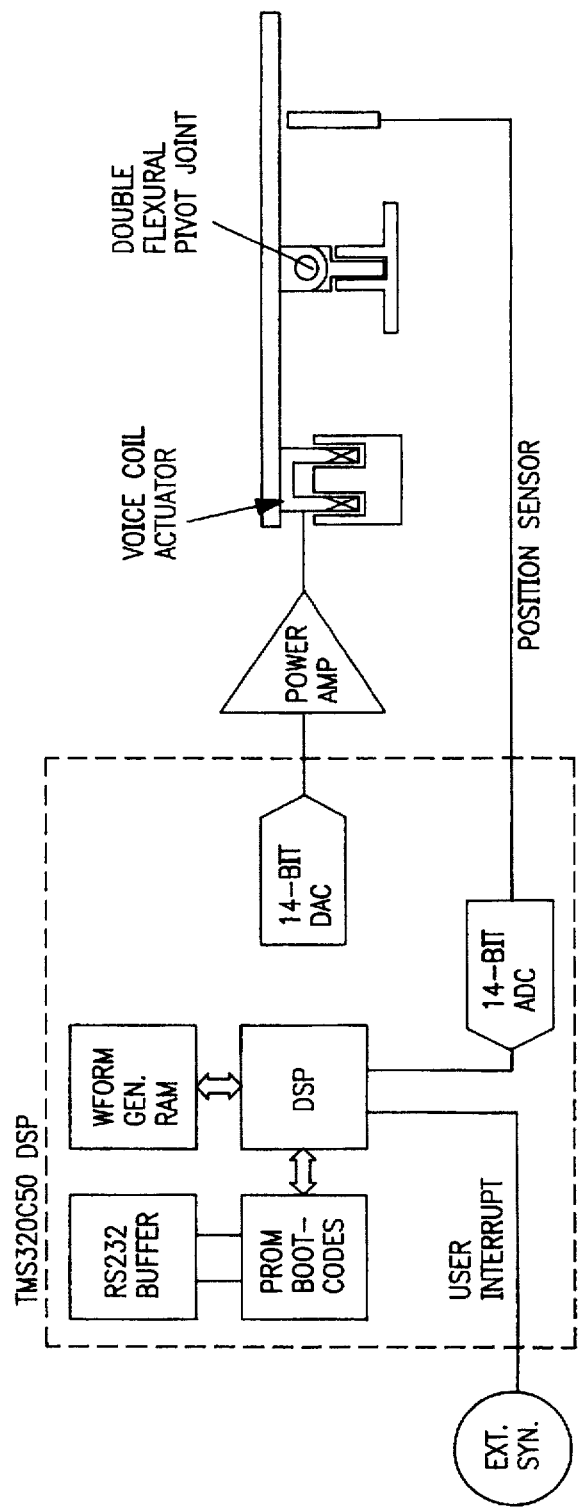
FIG. 5 is a block diagram of an example step-stare reflector system for FIG. 4.
Figure 6A:
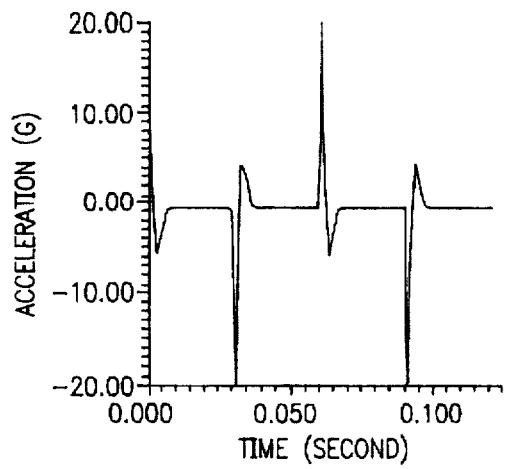
FIG. 6 illustrates example parameters for programming the step-stare reflector of FIG. 5.
Figure 6B:
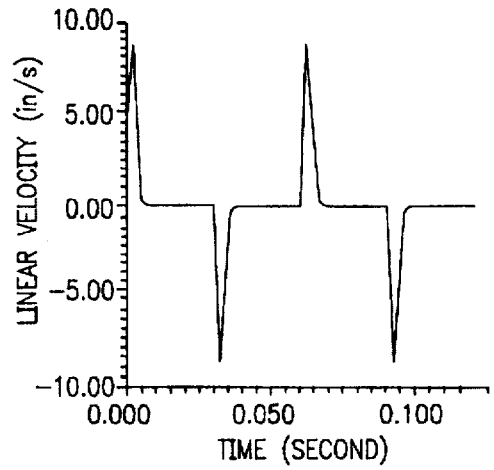
Figure 6C:
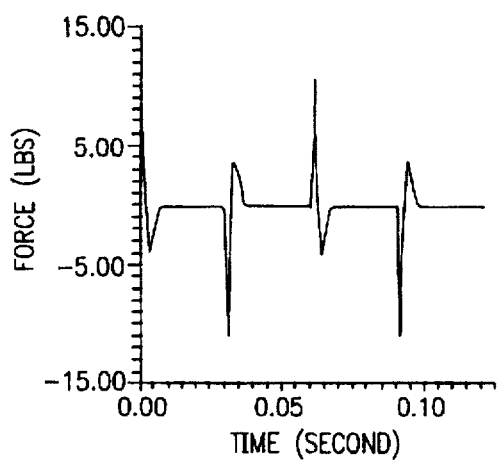
Figure 6D:
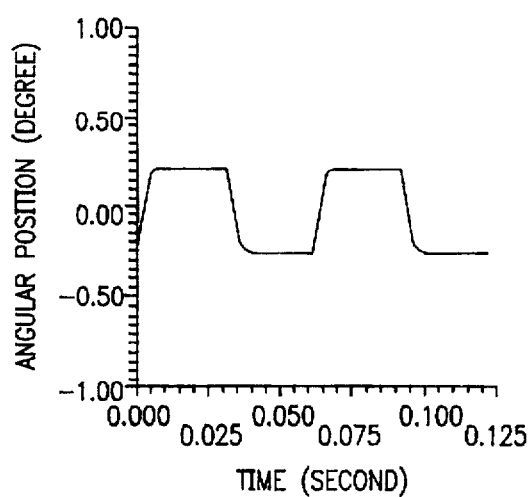

An example step-stare reflector is described here. Although the present invention does not depend on a particular mechanism of the step-stare reflector used, the calibration accuracy indeed depends strongly on the image position and alignment accuracy of the reflector. A block diagram for the step-stare reflector mechanism is shown in FIG. 5. The reflector is made of a light weight (0.75 lbs.), 10"×11.5"×0.5" honeycomb aluminum plate for millimeter wave application (at 90 Ghz). The surface flatness is maintained to within 1/10 of the wavelength which is 0.133." The plate is supported at the center using two double-end flexure pivots, Model Lucas 6008-400, with high radial stiffness (22,000 lbs./in) and small spring rate (0.114 lb./in/degree).

The motion of the reflector is actuated using four high quality voice-coil actuators, Model EBI LA15-15-000, with a force constant 1.35 lb./Amp. The actuator coils have time response faster than 100 micro-seconds, allowing close simulation of the actuator waveform in the frequency range from DC to above 20 kHz. Two precision position sensors, Model Keyence EX-500-016, with a linearity =±0.3% of FS, 0-5 mm detecting distance are implemented to sense and feed-back control the step-stare motion to achieve the desired timing and position accuracy.

Empirically, a current waveform model can be used to produce the required step-stare motion: (1) moving the image from position $P_{ij}$, $P_{i+1,j}$, $P_{ji+1,j+1}$, and positioning $P_{ij+1}$ in a four-step cyclic motion; (2) timing all motions to take place in less than 5 milliseconds, following a 10 millisecond motionless dwell time; (3) achieving position accuracy of less than 0.1 pixel distance; and (4) achieving timing accuracy of better than 0.1 milliseconds. A summary of current waveform is given in FIG. 6.

The current waveform model compares the motions of the actuators to the motion of a harmonic oscillator: $I\xi d^2\theta/dt^2 + B d\theta/dt + K = N(t)$, (relation 6). Where $I\xi$=Inertia about axes $\xi$=x,y; B relates to the back electromotive force (EMF) by the actuator coils, K is the characteristic spring rate and N(t) is the required current waveform for the actuator torque. By determining the relationship between the force constant and the magnitude of the back EMF constant B, relation 6 can be integrated to obtain the position profile $\theta(t)$ for a given current waveform N(t).

The force waveform in FIG. 6 is proportional to the actuator current waveform, $N(t)=F(t)L=I(t)K_F L$, where $K_F$ is the actuator force constant and L is the effective arm-length of the torque. This waveform can be obtained by differentiating the desired position profile $\theta(t)$, as shown in relation 6. Alternatively, N(t) can be modeled using a few scaling parameters and numerically integrated relation 6 to obtain $\theta(t)$. The latter approach defines the relationship between the damping coefficient B and the back EMF. Within an accuracy of a few percents, $B=K_F^2 L$, where $K_F$ is the same force constant of the actuator voice-coil and L is the effective arm-length. Solution N(t) can be optimized by a number of trade-offs, including the peak force magnitude, the rise time requirement, the accuracy requirement, the power consumption requirement, etc.

A Texas Instruments model TMS320C5X digital signal processing (DSP) Kit can be used for the control of the actuators and the data acquisition from the position sensors. The actuator current waveform is pre-loaded into the circular buffer of the TMS320C5CX PROM. This waveform is sequentially read into the driver program to generate a voltage drive signal through the on-board analog interface circuit model TLC32040C, which includes a 14-bit bipolar DAC and a dual channel 14 bit ADC. The output of the DAC is buffered and applied through two Model APEX 12PA power amplifiers to the actuators. With the correct current waveform, the current phases of the four actuators were arranged to generate the four-step step-stare motion as follows: Referring to actuator 1 (zero phase), actuator 2 lags 90°, actuator 3 lags 180° and actuator 4 lags 270°. The on-board ADC are used to monitor the position sensor signals to provide precision control for the actuator balance positions.

The mechanism of the millimeter-wave step-stare reflector described herein can be applied to other optics bands with shorter or longer wavelengths.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of calibrating gains and offsets for a two-dimensional detector array comprising individual detector elements, the method comprising the steps of:

(a) focusing a first incoming image signal at a first power level onto the detector array;

(b) reading the corresponding electrical signals from the detector elements as a first image frame at the first power level;

(c) for each detector element, translating the first incoming image signal by a detector element distance onto an adjacent detector element;

(d) reading the corresponding electrical signal from the detector elements as a second image frame at the first power level;

(e) focusing a second incoming image signal at a second power level onto the detector array;

(f) reading the corresponding electrical signals from the detector elements as a first image frame at the second power level;

(g) for each detector element, translating the second incoming image signal by a detector element distance onto an adjacent detector element;

(h) reading the corresponding electrical signals from the detector elements as a second image frame at the second power level;

(i) selecting a reference detector element;

(j) determining the gain of detector elements adjacent to the reference detector element from: (1) the corresponding electrical signals of the reference detector element and said adjacent detector elements from the first and the second images at the first and the second power levels, respectively, and (2) the gain of the reference detector element;

(k) determining the offset of said adjacent detector elements from: (1) the corresponding electrical signals of the reference detector element and said adjacent detector elements from the first and second image frames at the first power level, (2) the gain of the reference detector element, (3) the offset of the reference detector element, and (4) the gain of said adjacent detector elements; and (l) repeating steps (i) and (k) for one or more detector elements of the detector array.

2. The method of claim 1 wherein the step of determining the gain of the adjacent detector elements includes computing: (1) the ratio of the difference of the electrical signals observed by the reference detector under the two source power levels, to the difference of the electrical signals observed by the adjacent detectors under the two source power levels, and (2) the gain of the reference detector.

3. The method of claim 2 wherein the step of determining the gain of the adjacent detector elements comprises computing the relation:

$$A_{i+1,j} = (V'_{ij} - V_{ij})/(V'_{i+1,j} - V_{i+1,j}) \times A_{ij}$$

wherein:

N and M define the dimensions of the rows and columns of the detector array, respectively;

$i = 1, 2, \ldots N-1$;

$j = 1, 2, \ldots M$;

$V_{ij}$ is the electrical signal of a reference detector element ij from the first image frame at the first power level;

$V'_{ij}$ is the electrical signal of the reference detector element ij from the first image frame at the second power level;

$V_{i+1,j}$ is the electrical signal of an adjacent detector element i+1j from the second image frame at the first power level;

$V'_{i+1,j}$ is the electrical signal of the adjacent detector element i+1j from the second image signal at the second power level;

$A_{ij}$ is the gain of the reference detector element ij; and $A_{i+1,j}$ is the gain of the adjacent detector element i+1j.

4. The method of claim 1 wherein the step of determining the offset of the adjacent detector element comprises computing the relation:

$$O_{i+1,j} = (V_{ij}/A_{ij} - V_{i+1,j}/A_{i+1,j}) + O_{ij} A_{ij}/A_{i+1,j}$$

wherein:

N and M define the dimensions of the rows and columns of the detector array, respectively;

$i = 1, 2, \ldots N-1$;

$j = 1, 2 \ldots M$;

$V_{ij}$ is the electrical signal of a reference detector element ij from the first image frame at the first power level;

$V_{i+1,j}$ is the electrical signal of an adjacent detector element i+1j from the second image frame at the first power level;

$A_{ij}$ is the gain of the reference detector element ij;

$A_{i+1,j}$ is the gain of the adjacent detector element i+1j;

$O_{ij}$ is the offset of the reference detector element ij; and $O_{i+1,j}$ is the offset of the adjacent detector element i+1j.

5. A method of calibrating gains and offsets for a two-dimensional detector array comprising individual detector elements, the method comprising the steps of:

(a) focusing a first incoming image signal at a first power level onto the detector array;

(b) reading the corresponding electrical signals from the detector elements as a first image frame at the first power level;

(c) for each detector element, translating the first incoming image signal by a detector element distance onto an adjacent detector element;

(d) reading the corresponding electrical signal from the detector elements as a second image frame at the first power level;

(e) focusing a second incoming image signal at a second power level onto the detector array;

(f) reading the corresponding electrical signals from the detector elements as a first image frame at the second power level;

(g) for each detector element, translating the second incoming image signal by a detector element distance onto an adjacent detector element;

(h) reading the corresponding electrical signals from the detector elements as a second image frame at the second power level;

(i) selecting a reference detector element;

(j) determining the gain of detector elements adjacent to the reference detector elements by computing the relation:

$$A_{i+1,j} = (V'_{ij} - V_{ij})/(V'_{i+1,j} - V_{i+1,j}) \times A_{ij}$$

wherein:

N and M define the dimensions of the rows and columns of the detector array, respectively;

$i = 1, 2, \ldots N-1$;

$j = 1, 2, \ldots M$;

$V_{ij}$ is the electrical signal of a reference detector element ij from the first image frame at the first power level;

$V'_{ij}$ is the electrical signal of the reference detector element ij from the first image frame at the second power level;

$V_{i+1,j}$ is the electrical signal of an adjacent detector element i+1j from the second image frame at the first power level;

$V'_{i+1,j}$ is the electrical signal of the adjacent detector element i+1j from the second image signal at the second power level;

$A_{ij}$ is the gain of the reference detector element ij; and $A_{i+1,j}$ is the gain of the adjacent detector element i+1j;

(k) determining the offset of said adjacent detector elements by computing the relation:

$$O_{i+1,j} = (V_{ij}/A_{ij} - V_{i+1,j}/A_{i+1,j}) + O_{ij}A_{ij}/A_{i+1,j}$$

wherein:
N and M define the dimensions of the rows and columns of the detector array, respectively;
i=1,2, ... N−1;
j=1,2, ... M;
$V_{ij}$ is the electrical signal of a reference detector element ij from the first image frame at the first power level;
$V_{i+1,j}$ is the electrical signal of an adjacent detector element i+1j from the second image frame at the first power level;
$A_{ij}$ is the gain of the reference detector element ij;
$A_{i+1,j}$ is the gain of the adjacent detector element i+1j;
$O_{ij}$ is the offset of the reference detector element ij; and
$O_{i+1,j}$ is the offset of the adjacent detector element i+1j; and (l) repeating steps (i) and (k) for one or more detector elements of the detector array.

6. A method of calibrating gains and offsets for a two-dimensional detector array comprising individual detector elements, the method comprising the steps of:

(a) focusing a first incoming image signal at a first power level onto the detector array;

(b) reading the corresponding electrical signals from the detector elements as a first image frame at the first power level;

(c) for each detector element, translating the first incoming image signal by a detector element distance onto an adjacent detector element;

(d) reading the corresponding electrical signal from the detector elements as a second image frame at the first power level;

(e) focusing a second incoming image signal at a second power level onto the detector array;

(f) reading the corresponding electrical signals from the detector elements as a first image frame at the second power level;

(g) for each detector element, translating the second incoming image signal by a detector element distance onto an adjacent detector element;

(h) reading the corresponding electrical signals from the detector elements as a second image frame at the second power level;

(i) selecting a reference detector element;

(j) determining the gain of detector elements adjacent to the reference detector element from: (1) the corresponding electrical signals of the reference detector element and said adjacent detector elements from the first and the second images at the first and the second power levels, respectively, and (2) the gain of the reference detector element;

(k) determining the offset of said adjacent detector elements from: (1) the corresponding electrical signals of the reference detector element and said adjacent detector elements from the first and second image frames at the second power level, (2) the gain of the reference detector element, (3) the offset of the reference detector element, and (4) the gain of said adjacent detector elements; and (l) repeating steps (i) and (k) for one or more detector elements of the detector array.

7. The method of claim 6 wherein the step of determining the gain of the adjacent detector elements comprises computing the relation:

$$A_{i+1,j} = (V'_{ij} - V_{ij})/(V'_{i+1,j} - V_{i+1,j}) \times A_{ij}$$

wherein:
N and M define the dimensions of the rows and columns of the detector array, respectively;
i=1,2, ... N−1;
j=1,2, ... M;
$V_{ij}$ is the electrical signal of a reference detector element ij from the first image frame at the first power level;
$V'_{ij}$ is the electrical signal of the reference detector element ij from the first image frame at the second power level;
$V_{i+1,j}$ is the electrical signal of an adjacent detector element i+1j from the second image frame at the first power level;
$V'_{i+1,j}$ is the electrical signal of the adjacent detector element i+1j from the second image signal at the second power level;
$A_{ij}$ is the gain of the reference detector element ij; and
$A_{i+1,j}$ is the gain of the adjacent detector element i+1j.

8. The method of claim 6 wherein the step of determining the offset of the adjacent detector element comprises computing the relation:

$$O_{i+1,j} = (V_{ij}/A_{ij} - V_{i+1,j}/A_{i+1,j}) + O_{ij}A_{ij}/A_{i+1,j}$$

wherein:
N and M define the dimensions of the rows and columns of the detector array, respectively;
i=1,2, ... N−1;
j=1,2, ... M;
$V'_{ij}$ is the electrical signal of a reference detector element ij from the first image frame at the second power level;
$V'_{i+1,j}$ is the electrical signal of an adjacent detector element i+1j from the second image frame at the second power level;
$A_{ij}$ is the gain of the reference detector element ij;
$A_{i+1,j}$ is the gain of the adjacent detector element i+1j;
$O_{ij}$ is the offset of the reference detector element ij; and
$O_{i+1,j}$ is the offset of the adjacent detector element i+1j.

9. A method of calibrating gains and offsets for a two-dimensional detector array comprising individual detector elements, the method comprising the steps of:

(a) focusing a first incoming image signal at a first power level onto the detector array;

(b) reading the corresponding electrical signals from the detector elements as a first image frame at the first power level;

(c) for each detector element, translating the first incoming image signal by a detector element distance onto an adjacent detector element;

(d) reading the corresponding electrical signal from the detector elements as a second image frame at the first power level;

(e) focusing a second incoming image signal at a second power level onto the detector array;

(f) reading the corresponding electrical signals from the detector elements as a first image frame at the second power level;

(g) for each detector element, translating the second incoming image signal by a detector element distance onto an adjacent detector element;

(h) reading the corresponding electrical signals from the detector elements as a second image frame at the second power level;

(i) selecting a reference detector element;

(j) determining the gain of detector elements adjacent to the reference detector element by computing the relation:

$$A_{i+1j}=(V_{ij}-V_{ij})/(V'_{i+1j}-V_{i+1j}) \times A_{ij}$$

wherein:
N and M define the dimensions of the rows and columns of the detector array, respectively;
i=1,2, ... N−1;
j=1,2, ... M;
$V_{ij}$ is the electrical signal of a reference detector element ij from the first image frame at the first power level;
$V'_{ij}$ is the electrical signal of the reference detector element ij from the first image frame at the second power level;
$V_{i+1j}$ is the electrical signal of an adjacent detector element i+1j from the second image frame at the first power level;
$V'_{i+1j}$ is the electrical signal of the adjacent detector element i+1j from the second image signal at the second power level;
$A_{ij}$ is the gain of the reference detector element ij; and
$A_{i+1j}$ is the gain of the adjacent detector element i+1j;

(k) determining the offset of said adjacent detector elements by computing the relation:

$$O_{i+1j}=(V'_{ij}/A_{ij}-V'_{i+1j}/A_{i+1j})+O_{ij}A_{ij}/A_{i+1j}$$

wherein:
N and M define the dimensions of the rows and columns of the detector array, respectively;
i=1,2, ... N−1;
j=1,2, ... M;
$V'_{ij}$ is the electrical signal of a reference detector element ij from the first image frame at the second power level;
$V'_{i+1j}$ is the electrical signal of an adjacent detector element i+1j from the second image frame at the second power level;
$A_{ij}$ is the gain of the reference detector element ij;
$A_{i+1j}$ is the gain of the adjacent detector element i+1j;
$O_{ij}$ is the offset of the reference detector element ij; and
$O_{i+1j}$ is the offset of the adjacent detector element i+1j; and (l) repeating steps (i) and (k) for one or more detector elements of the detector array.

10. A computer software system for calibrating gains and offsets for a two-dimensional detector array comprising individual detector elements, the software system comprising:

(a) program instructions for focusing a first incoming image signal at a first power level onto the detector array;

(b) program instructions for reading the corresponding electrical signals from the detector elements as a first image frame at the first power level;

(c) program instructions for translating the first incoming image signal by a detector element distance onto an adjacent detector element for each detector element;

(d) program instructions for reading the corresponding electrical signal from the detector elements as a second image frame at the first power level;

(e) program instructions for focusing a second incoming image signal at a second power level onto the detector array;

(f) program instructions for reading the corresponding electrical signals from the detector elements as a first image frame at the second power level;

(g) program instructions for translating the second incoming image signal by a detector element distance onto an adjacent detector element for each detector element;

(h) program instructions for reading the corresponding electrical signals from the detector elements as a second image frame at the second power level; and (i) program instructions for:
 (1) selecting a reference detector element;
 (2) determining the gain of detector elements adjacent to the reference detector element from: (a) the corresponding electrical signals of the reference detector element and said adjacent detector elements from the first and the second images at the first and the second power levels, respectively, and (b) the gain of the reference detector element; and
 (3) determining the offset of said adjacent detector elements from: (a) the corresponding electrical signals of the reference detector element and said adjacent detector elements from the first and second image frames at the first power level, (b) the gain of the reference detector element, (c) the offset of the reference detector element, and (d) the gain of said adjacent detector elements.

11. The computer software system of claim 10 wherein the program instructions in part (i) include program instructions for performing steps (i)(1)–(i)(3) for two or more detector elements in the array.

12. The computer software system of claim 10 wherein the program instruction for determining the gain of the adjacent detector elements includes program instruction for computing the relation:

$$A_{i+1j}=(V_{ij}-V_{ij})/(V'_{i+1j}-V_{i+1j}) \times A_{ij}$$

wherein:
N and M define the dimensions of the rows and columns of the detector array, respectively;
i=1,2, ... N−1;
j=1,2 ... M;
$V_{ij}$ is the electrical signal of a reference detector element ij from the first image frame at the first power level;
$V'_{ij}$ is the electrical signal of the reference detector element ij from the first image frame at the second power level;
$V_{i+1j}$ is the electrical signal of an adjacent detector element i+1j from the second image frame at the first power level;
$V'_{i+1j}$ is the electrical signal of the adjacent detector element i+1j from the second image signal at the second power level;
$A_{ij}$ is the gain of the reference detector element ij; and
$A_{i+1j}$ is the gain of the adjacent detector element i+1j.

13. The computer software system of claim 10 wherein the program instructions for determining the offset of the adjacent detector elements include program instructions for computing the relation:

$$O_{i+1,j}=(V_{ij}/A_{ij}-V_{i+1,j}/A_{i+1,j})+O_{ij}A_{ij}/A_{i+1,j}$$

wherein:

N and M define the dimensions of the rows and columns of the detector array, respectively;

i=1,2, ... N-1;

j=1,2, ... M;

$V_{ij}$ is the electrical signal of a reference detector element ij from the first image frame at the first power level;

$V_{i+1,j}$ is the electrical signal of an adjacent detector element i+1j from the second image frame at the first power level;

$A_{ij}$ is the gain of the reference detector element ij;

$A_{i+1,j}$ is the gain of the adjacent detector element i+1j;

$O_{ij}$ is the offset of the reference detector element ij; and $O_{i+1,j}$ is the offset of the adjacent detector element i+1j.

14. A computer software system for calibrating gains and offsets for a two-dimensional detector array comprising individual detector elements, the software system comprising:

(a) program instructions for focusing a first incoming image signal at a first power level onto the detector array;

(b) program instructions for reading the corresponding electrical signals from the detector elements as a first image frame at the first power level;

(c) program instructions for translating the first incoming image signal by a detector element distance onto an adjacent detector element for each detector element;

(d) program instructions for reading the corresponding electrical signal from the detector elements as a second image frame at the first power level;

(e) program instructions for focusing a second incoming image signal at a second power level onto the detector array;

(f) program instructions for reading the corresponding electrical signals from the detector elements as a first image frame at the second power level;

(g) program instructions for translating the second incoming image signal by a detector element distance onto an adjacent detector element for each detector element;

(h) program instructions for reading the corresponding electrical signals from the detector elements as a second image frame at the second power level;

(i) program instructions for:

(1) selecting a reference detector element;

(2) determining the gain of detector elements adjacent to the reference detector element from: (a) the corresponding electrical signals of the reference detector element and said adjacent detector elements from the first and the second images at the first and the second power levels, respectively, and (b) the gain of the reference detector element; and (3) determining the offset of said adjacent detector elements from: (a) the corresponding electrical signals of the reference detector element and said adjacent detector elements from the first and second image frames at the second power level, (b) the gain of the reference detector element, (c) the offset of the reference detector element, and (d) the gain of said adjacent detector elements.

15. The software system of claim 14 wherein the program instructions in part (i) include program instructions for performing steps (i)(1)–(i)(3) for two or more detector elements in the array.

16. The software system of claim 14 wherein the program instructions for determining the gain of the adjacent detector elements includes program instructions for computing the relation:

$$A_{i+1,j}=(V'_{ij}-V_{ij})/(V'_{i+1,j}-V_{i+1,j})\times A_{ij}$$

wherein:

N and M define the dimensions of the rows and columns of the detector array, respectively;

i=1,2, ... N-1;

j=1,2, ... M;

$V_{ij}$ is the electrical signal of a reference detector element ij from the first image frame at the first power level;

$V'_{ij}$ is the electrical signal of the reference detector element ij from the first image frame at the second power level;

$V_{i+1,j}$ is the electrical signal of an adjacent detector element i+1j from the second image frame at the first power level;

$V'_{i+1,j}$ is the electrical signal of the adjacent detector element i+1j from the second image signal at the second power level;

$A_{ij}$ is the gain of the reference detector element ij; and $A_{i+1,j}$ is the gain of the adjacent detector element i+1j.

17. The method of claim 14 wherein the program instructions for determining the offset of the adjacent detector element include program instructions for computing the relation:

$$O_{i+1,j}=(V'_{ij}/A_{ij}-V'_{i+1,j}/A_{i+1,j})+O_{ij}A_{ij}/A_{i+1,j}$$

wherein:

N and M define the dimensions of the rows and columns of the detector array, respectively;

i=1,2, ... N-1;

j=1,2, ... M;

$V'_{ij}$ is the electrical signal of a reference detector element ij from the first image frame at the second power level;

$V'_{i+1,j}$ is the electrical signal of an adjacent detector element i+1j from the second image frame at the second power level;

$A_{ij}$ is the gain of the reference detector element ij;

$A_{i+1,j}$ is the gain of the adjacent detector element i+1j;

$O_{ij}$ is the offset of the reference detector element ij; and $O_{i+1,j}$ is the offset of the adjacent detector element i+1j.

18. A focal plane array calibration system for calibrating the gains and offsets for a two-dimensional detector array comprising individual detector elements, the system comprising:

(a) an optical assembly for focusing incoming image signals onto the detector array;

(b) an input system for reading the corresponding electrical signals from the detector elements; and (c) a controller for controlling the optical assembly and the input system for:

(1) focusing a first incoming image signal at a first power level onto the detector array;

(2) reading the corresponding electrical signals from the detector elements as a first image frame at the first power level;

(3) translating the first incoming image signal by a detector element distance onto an adjacent detector element for each detector element;

(4) reading the corresponding electrical signals from the detector elements as a second image frame at the first power level;

(5) focusing a second incoming image signal at a second power level onto the detector array;

(6) reading the corresponding electrical signals from the detector elements as a first image frame at the second power level;

(7) translating the second incoming image signal by a detector element distance onto an adjacent detector element for each detector element; and (8) reading the corresponding electrical signals from the detector elements as a second image frame at the second power level;

(d) a processor for:

(1) selecting a reference detector element;

(2) determining the gain of detector elements adjacent to the reference detector element from: (a) the corresponding electrical signals of the reference detector element and said adjacent detector elements from the first and the second images at the first and the second power levels, respectively, and (b) the gain of the reference detector element;

(3) determining the offset of said adjacent detector elements from: (a) the corresponding electrical signals of the reference detector element and said adjacent detector elements from the first and second image frames at the first power level, (b) the gain of the reference detector element, (c) the offset of the reference detector element, and (d) the gain of said adjacent detector elements.

19. The system of claim 18 wherein the processor includes means for determining the gain of the adjacent detector elements by computing the relation:

$$A_{i+1,j} = (V_{ij} - V'_{ij})/(V'_{i+1,j} - V_{i+1,j}) \times A_{ij}$$

wherein:

N and M define the dimensions of the rows and columns of the detector array, respectively;

i=1,2, ... N−1;

j=1,2, ... M;

$V_{ij}$ is the electrical signal of a reference detector element ij from the first image frame at the first power level;

$V'_{ij}$ is the electrical signal of the reference detector element ij from the first image frame at the second power level;

$V_{i+1,j}$ is the electrical signal of an adjacent detector element i+1j from the second image frame at the first power level;

$V'_{i+1,j}$ is the electrical signal of the adjacent detector element i+1j from the second image signal at the second power level;

$A_{ij}$ is the gain of the reference detector element ij; and $A_{i+1,j}$ is the gain of the adjacent detector element i+1j.

20. The system of claim 18 wherein the processor includes means for determining the offset of the adjacent detector elements by computing the relation:

$$O_{i+1,j} = (V_{ij}/A_{ij} - V_{i+1,j}/A_{i+1,j}) + O_{ij} A_{ij}/A_{i+1,j}$$

wherein:

N and M define the dimensions of the rows and columns of the detector array, respectively;

i=1,2, ... N−1;

j=1,2 ... M;

$V_{ij}$ is the electrical signal of a reference detector element ij from the first image frame at the first power level;

$V_{i+1,j}$ is the electrical signal of an adjacent detector element i+1j from the second image frame at the first power level;

$A_{ij}$ is the gain of the reference detector element ij;

$A_{i+1,j}$ is the gain of the adjacent detector element i+1j;

$O_{ij}$ is the offset of the reference detector element ij; and $O_{i+1,j}$ is the offset of the adjacent detector element i+1j.

21. A focal plane array calibration system for calibrating the gains and offsets for a two-dimensional detector array comprising individual detector elements, the system comprising:

(a) an optical assembly for focusing incoming image signals onto the detector array;

(b) an input system for reading the corresponding electrical signals from the detector elements; and (c) a controller for controlling the optical assembly and the input system for:

(1) focusing a first incoming image signal at a first power level onto the detector array;

(2) reading the corresponding electrical signals from the detector elements as a first image frame at the first power level;

(3) translating the first incoming image signal by a detector element distance onto an adjacent detector element for each detector element;

(4) reading the corresponding electrical signals from the detector elements as a second image frame at the first power level;

(5) focusing a second incoming image signal at a second power level onto the detector array;

(6) reading the corresponding electrical signals from the detector elements as a first image frame at the second power level;

(7) translating the second incoming image signal by a detector element distance onto an adjacent detector element for each detector element; and (8) reading the corresponding electrical signals from the detector elements as a second image frame at the second power level;

(d) a processor for:

(1) selecting a reference detector element;

(2) determining the gain of detector elements adjacent to the reference detector element from: (a) the corresponding electrical signals of the reference detector element and said adjacent detector elements from the first and the second images at the first and the second power levels, respectively, and (b) the gain of the reference detector element;

(3) determining the offset of said adjacent detector elements from: (a) the corresponding electrical signals of the reference detector element and said adjacent detector elements from the first and second image frames at the second power level, (b) the gain of the reference detector element, (c) the offset of the reference detector element, and (d) the gain of said adjacent detector elements.

22. The system of claim 21 wherein the processor includes means for determining the gain of the adjacent detector elements by computing the relation:

$$A_{i+1,j} = (V'_{ij} - V_{ij})/(V'_{i+1,j} - V_{i+1,j}) \times A_{ij}$$

wherein:
N and M define the dimensions of the rows and columns of the detector array, respectively;
i=1,2, ... N-1;
j=1,2, ... M;
$V_{ij}$ is the electrical signal of a reference detector element ij from the first image frame at the first power level;
$V'_{ij}$ is the electrical signal of the reference detector element ij from the first image frame at the second power level;
$V_{i+1,j}$ is the electrical signal of an adjacent detector element i+1j from the second image frame at the first power level;
$V'_{i+1,j}$ is the electrical signal of the adjacent detector element i+1j from the second image signal at the second power level;
$A_{ij}$ is the gain of the reference detector element ij; and
$A_{i+1,j}$ is the gain of the adjacent detector element i+1j.

23. The system of claim 21 wherein the processor includes means for determining the offset of the adjacent detector elements by computing the relation:

$$O_{i+1,j} = (V'_{ij}/A_{ij} - V'_{i+1,j}/A_{i+1,j}) + O_{ij}A_{ij}/A_{i+1,j}$$

wherein:
N and M define the dimensions of the rows and columns of the detector array, respectively;
i=1,2, ... N-1;
j=1,2, ... M;
$V'_{ij}$ is the electrical signal of a reference detector element ij from the first image frame at the second power level;
$V'_{i+1,j}$ is the electrical signal of an adjacent detector element i+1j from the second image frame at the second power level;
$A_{ij}$ is the gain of the reference detector element ij;
$A_{i+1,j}$ is the gain of the adjacent detector element i+1j;
$O_{ij}$ is the offset of the reference detector element ij; and
$O_{i+1,j}$ is the offset of the adjacent detector element i+1j.

\* \* \* \* \*